(12) United States Patent
Mast et al.

(10) Patent No.: US 11,158,949 B2
(45) Date of Patent: Oct. 26, 2021

(54) DEPLOYABLE HORN ANTENNA AND ASSOCIATED METHODS

(71) Applicant: EAGLE TECHNOLOGY, LLC, Melbourne, FL (US)

(72) Inventors: Alan W. Mast, Melbourne Beach, FL (US); Gregory M. Jandzio, Melbourne, FL (US); Charles F. Dull, Palm Bay, FL (US); Brinnan C. Riley, West Melbourne, FL (US); Daniel A. Robison, Palm Bay, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 312 days.

(21) Appl. No.: 16/507,224

(22) Filed: Jul. 10, 2019

(65) Prior Publication Data

US 2021/0013615 A1    Jan. 14, 2021

(51) Int. Cl.
*H01Q 13/02* (2006.01)
*H01Q 1/08* (2006.01)
(Continued)

(52) U.S. Cl.
CPC .............. *H01Q 13/02* (2013.01); *H01Q 1/085* (2013.01); *H01Q 1/38* (2013.01); *H01Q 21/0037* (2013.01); *H04B 1/40* (2013.01)

(58) Field of Classification Search
CPC .......... H01Q 1/085; H01Q 1/081; H01Q 1/38; H01Q 1/48; H01Q 11/10; H01Q 19/28;
(Continued)

(56) References Cited

U.S. PATENT DOCUMENTS

2018/0131098 A1*   5/2018  Morgan ............... H01Q 5/55
2020/0295469 A1*   9/2020  Fenn .................. H01Q 19/19

FOREIGN PATENT DOCUMENTS

JP        62117817       7/1987
JP        04000903       1/1992
(Continued)

OTHER PUBLICATIONS

Author: Iso Akio, Title: Horn Antenna, Date: Mar. 18, 1991, Publication: Oct. 13, 1992, p. 1-6 (Year: 1992).*
(Continued)

*Primary Examiner* — Wei (Victor) Y Chan
(74) *Attorney, Agent, or Firm* — Allen, Dyer, Doppelt, + Gilchrist, P.A. Attorneys at Law (57) ABSTRACT

An outer space deployable antenna may include a waveguide antenna feed section. A first plurality of wires and a first plurality of biased hinges may couple the first plurality of wires together to be self-biased to move between a collapsed stored configuration and an extended deployed configuration. A horn antenna section may be coupled to the waveguide antenna feed section and may include a second plurality of wires and a second plurality of biased hinges coupling the second plurality of wires together to be self-biased to move between the collapsed stored configuration and the extended deployed configuration. A flexible electrically conductive layer may cover the waveguide antenna feed section and the horn antenna section in at least the extended deployed configuration.

18 Claims, 5 Drawing Sheets

(51) Int. Cl.
*H01Q 1/38* (2006.01)
*H01Q 21/00* (2006.01)
*H04B 1/40* (2015.01)

(58) Field of Classification Search
CPC ........ H01Q 1/427; H01Q 1/288; H01Q 1/082;
H01Q 1/1292; H01Q 1/28; H01Q 5/55;
H01Q 13/02; H01Q 13/00
See application file for complete search history.

(56) References Cited

FOREIGN PATENT DOCUMENTS

| | | |
|---|---|---|
| JP | 0439705 | 4/1992 |
| JP | H04156101 | 5/1992 |
| JP | 04288705 | 10/1992 |
| JP | H07118604 | 12/1995 |
| RU | 2163741 | 2/2001 |

OTHER PUBLICATIONS

Author: Iso Akio, Title: Horn Antenna, Date: Mar. 18, 1991, Publication: Oct. 13, 1992, p. 1-6 (Translation) (Year: 1992).*
Sakovsky et al., "Rapid Design of Deployable Antennas for CubeSats," IEEE Antennas & Propagation Magazine, Apr. 2017, pp. 2-10.

* cited by examiner

DEPLOYABLE HORN ANTENNA AND ASSOCIATED METHODS

FIELD OF THE INVENTION

The present invention relates to the field of antennas, and more particularly, to outer space deployable antennas and related methods.

BACKGROUND OF THE INVENTION

Small satellites have limited space to store electronics and an antenna, which becomes technically challenging when the electronics and antenna are designed to operate at the lower L-band and S-band frequencies. High performance antenna operating at those frequencies usually require significant volume. Even antennas designed to operate at the higher frequencies up to and above 20 GHz have size constraints that make them difficult to implement into small satellites, even though antennas at those upper frequencies are usually reduced in size. This problem becomes challenging when small satellites are built as CubeSat platforms, which are miniaturized satellites made up of multiple block units known as CubeSats, each block unit being about 4 by 4 by 4 inches. CubeSats are advantageous for smaller satellites because they are designed to use commercial off-the-shelf (COTS) components for their major circuits and can be implemented for custom satellite operations.

In most practical small satellite applications, a number of CubeSat units are combined together to form a CubeSat platform as a small satellite that is typically intended for Low Earth Orbit (LEO) and perform scientific research and explore new space technologies. CubeSats are advantageous because their use as block units to build small satellites shortens the satellite development cycle, permits greater diversity in satellite design since each small satellite can be designed for a specific function, and reduces the overall cost of satellite deployment. CubeSats and even larger classes of small satellites often are suitable for launch with multiple small satellites per payload, thus using the excess capacity of larger launch vehicles and reducing the risk to the rest of the launch vehicle and other payloads.

Typical CubeSat satellite platforms are formed from multiple, individual CubeSat block units combined together and include a 6U design of about 4×8×12 inches or a 12U design of about 8×8×12 inches. Additionally, the small satellite class also envelopes larger form factors, such as EELV Secondary Payload Adapter (ESPA) each forming a satellite in the 100 to about 300 kg class. Small satellites can be propelled by cold gas, chemical promotion, electric propulsion, or solar sails. Most CubeSats and similar small satellites have internal batteries for power, which preferably include solar cells.

Many Low Earth Orbit (LEO) small satellites require an antenna for communicating in the L-band and S-band, and also X-band and Ka-band can be used for higher data rate communications. These higher frequency bands allow the use of smaller antennae due to the higher frequencies, but the constraints of small satellites, such as CubeSats, still make it difficult to implement workable antennas, even at the higher frequencies. These small satellites have limited volume and designing an antenna that can be compactly stored and deployed once orbit is reached is a challenge.

For example, horn antennas are often used on larger satellites, but take up a relatively large volume, especially at the lower L-band and S-band frequencies, and are challenging to fit onto smaller satellites. Wideband antennas and communication modems offer the valuable potential to communicate with various ground stations or even perhaps other satellites directly.

A log periodic parasitic monopole antenna (LPPMA), for example, operates as a high performance antenna and may be used in demanding satellite communication applications since it has wideband performance, multi-polarization, and excellent directivity. A technical drawback of this antenna, however, is its large volume, making it difficult to implement in small satellites. For example, a log periodic parasitic monopole antenna may have a wide 10:1 bandwidth and operate up to 20 GHz and provide six arms for multi-polarization in both transmit and receive applications, making that antenna advantageous, but difficult to implement in CubeSat applications. A multi-arm sinuous antenna has similar benefits, but again, it is difficult to implement that antenna in small satellites since the antenna requires a relatively large volume compared to the size of the satellite. A horn antenna is another popular satellite antenna since it can operate alone or as a feed antenna and have good directivity, low standing wave ratio (SWR), broad bandwidth and inexpensive construction and adjustment. However, a horn antenna should have a minimum size relative to the wavelength of the incoming or outgoing signal, and thus, the horn must be relatively large, again making a horn antenna difficult to implement on a small satellite. As a result, deployment of most antennas, including a horn antenna, is difficult on small satellites, especially those manufactured as CubeSats.

SUMMARY OF THE INVENTION

In general, an outer space deployable antenna may include a waveguide antenna feed section. A first plurality of wires and a first plurality of biased hinges may couple the first plurality of wires together to be self-biased to move between a collapsed stored configuration and an extended deployed configuration. A horn antenna section may be coupled to the waveguide antenna feed section and may comprise a second plurality of wires and a second plurality of biased hinges coupling the second plurality of wires together to be self-biased to move between the collapsed stored configuration and the extended deployed configuration. A flexible electrically conductive layer may cover the waveguide antenna feed section and the horn antenna section in at least the extended deployed configuration.

The waveguide antenna feed section may have a rectangular cross section in the extended deployed configuration. The waveguide antenna feed section may have a square cross section in the extended deployed configuration. The horn antenna section may have an inverted pyramidal cross section in the extended deployed configuration.

In some embodiments, the first plurality of wires may comprise first of pairs of wires, each first pair of wires comprising lower and upper wires with a corresponding hinge therebetween. The second plurality of wires may comprise a second pairs of wires, each second pair of wires comprising lower and upper wires with a corresponding hinge therebetween. The flexible electrically conductive layer may be coupled to the waveguide antenna feed section and the horn antenna section only at selected attachment points. The flexible electrically conductive layer may comprise a flexible dielectric layer and a metallization layer thereon.

In yet another embodiment, a satellite may include a satellite housing and a satellite transceiver carried by the satellite housing. An outer space deployable antenna may be carried by the satellite housing and may be coupled to the satellite transceiver. The outer space deployable antenna may comprise a waveguide antenna feed section that may comprise a first plurality of wires and a first plurality of biased hinges coupling the first plurality of wires together to be self-biased to move between a collapsed stored configuration and an extended deployed configuration. A horn antenna section may be coupled to the waveguide antenna feed section and may comprise a second plurality of wires and a second plurality of biased hinges coupling the second plurality of wires together to be self-biased to move between the collapsed stored configuration and the extended deployed configuration. A flexible electrically conductive layer may cover the waveguide antenna feed section and the horn antenna section in at least the extended deployed configuration.

In an example, the flexible electrically conductive layer may include etched patterns to interact and direct electromagnetic energy. The flexible electrically conductive layer may include electronic components.

Another aspect is directed to a method for making an outer space deployable antenna. The method includes assembling a waveguide antenna feed section that may comprise a first plurality of wires and a first plurality of biased hinges coupling the first plurality of wires together to be self-biased to move between a collapsed stored configuration and an extended deployed configuration. The method also includes assembling a horn antenna section coupled to the waveguide antenna feed section and comprising a second plurality of wires and a second plurality of biased hinges coupling the second plurality of wires together to be self-biased to move between the collapsed stored configuration and the extended deployed configuration. The method may further include covering the waveguide antenna feed section and the horn antenna section with a flexible electrically conductive layer.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
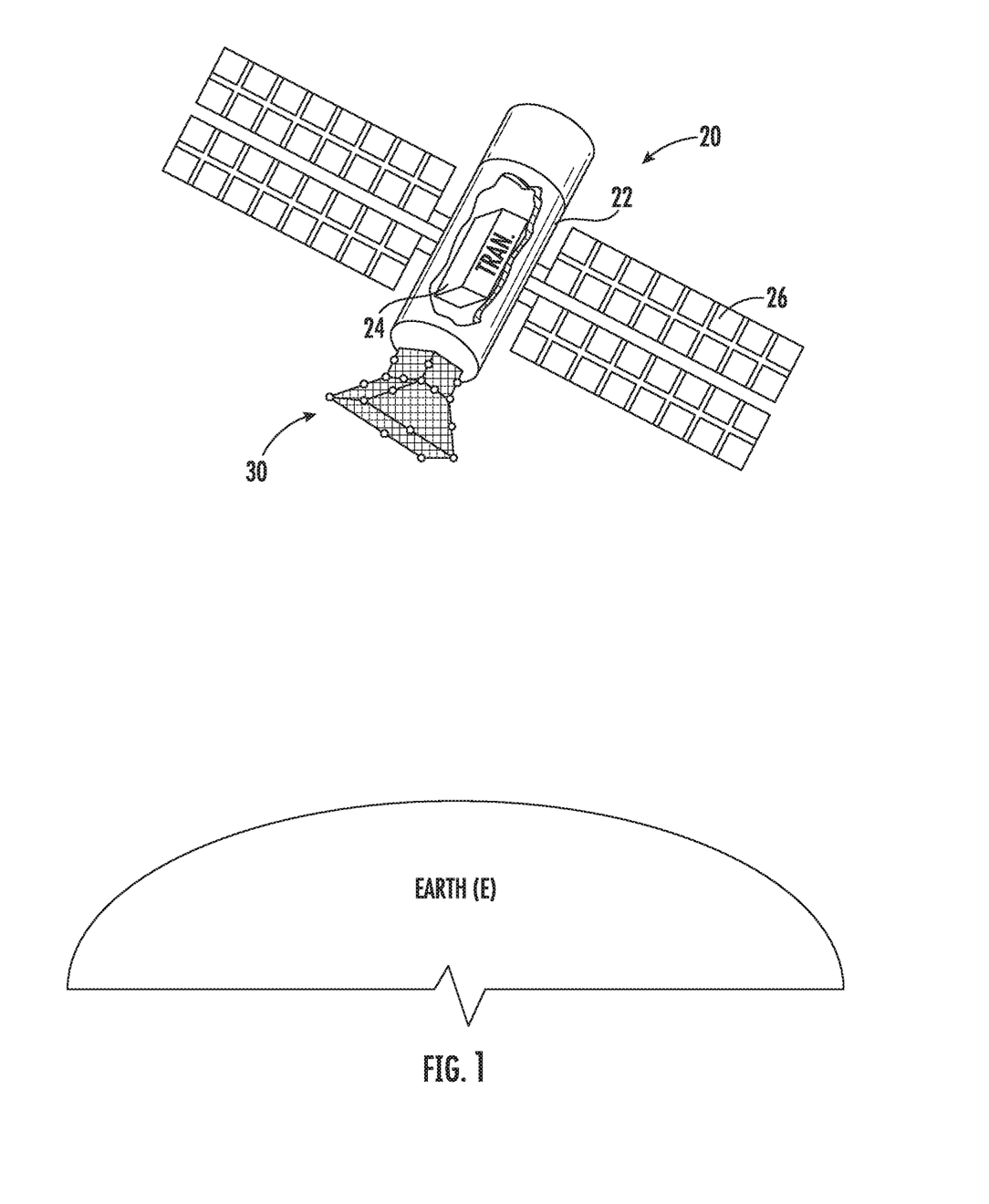
FIG. 1 is a front elevation view of a satellite carrying the outer space deployable antenna in its extended deployed configuration.

Referring initially to FIG. 1, a satellite is illustrated generally at 20 and shown orbiting Earth (E) in a Low Earth Orbit (LEO) as typical for small satellites, although other satellite orbit altitudes may be established depending on satellite functions and design. The satellite 20 includes a satellite housing 22 shown in partial cut away and a satellite transceiver 24 carried by the satellite housing 22 and solar panels 26. The satellite transceiver 24 and any associated electronic components and circuits may be formed from conventional Off-The-Shelf (OTS) components as is typical for those smaller satellites formed as CubeSats.

An outer space deployable antenna is indicated generally at 30 and formed as a horn antenna and carried by the satellite housing 22 and coupled to the satellite transceiver 24. Basic components of the outer space deployable antenna 30 are better illustrated in FIG. 5, and in a second embodiment of FIG. 6, and include a waveguide antenna feed section 32 that includes a first plurality of wires 34 and a first plurality of biased hinges 36 coupling the first plurality of wires together to be self-biased to move between the collapsed stored configuration and extended deployed configuration.

Figure 2:
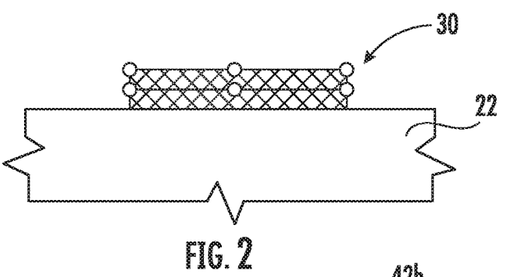
FIG. 2 is a front elevation view of the antenna of FIG. 1 in its collapsed stored configuration.
Figure 3:
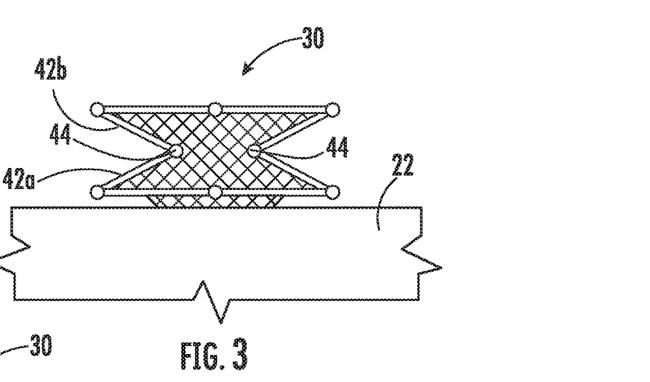
FIG. 3 is a front elevation view of the antenna of FIG. 2 as it is partially deployed.
Figure 4:
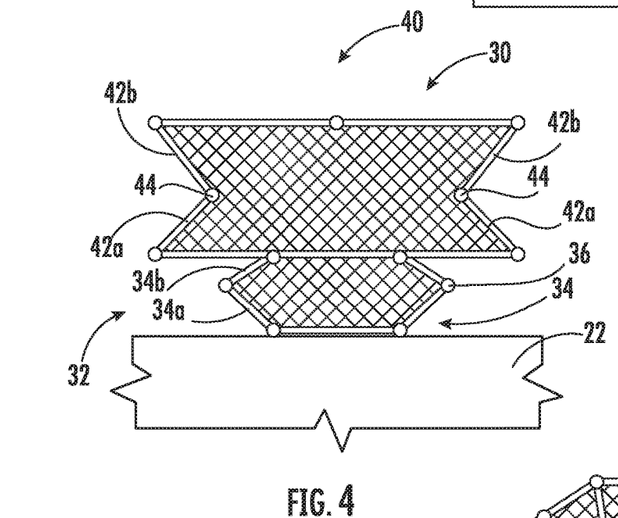
FIG. 4 is a front elevation view of the antenna of FIG. 3 as it is deployed more and showing portions of the flexible electrically conductive layer.
Figure 5:
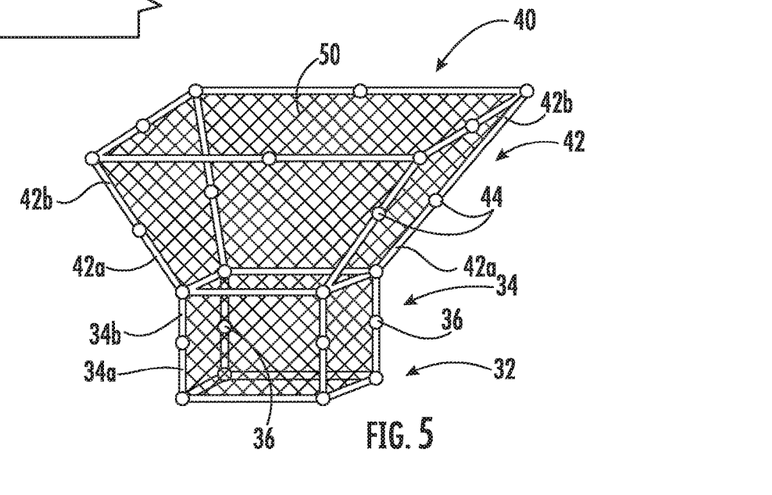
FIG. 5 is a perspective view of the antenna of FIG. 4 in its extended deployed configuration.
Figure 6:
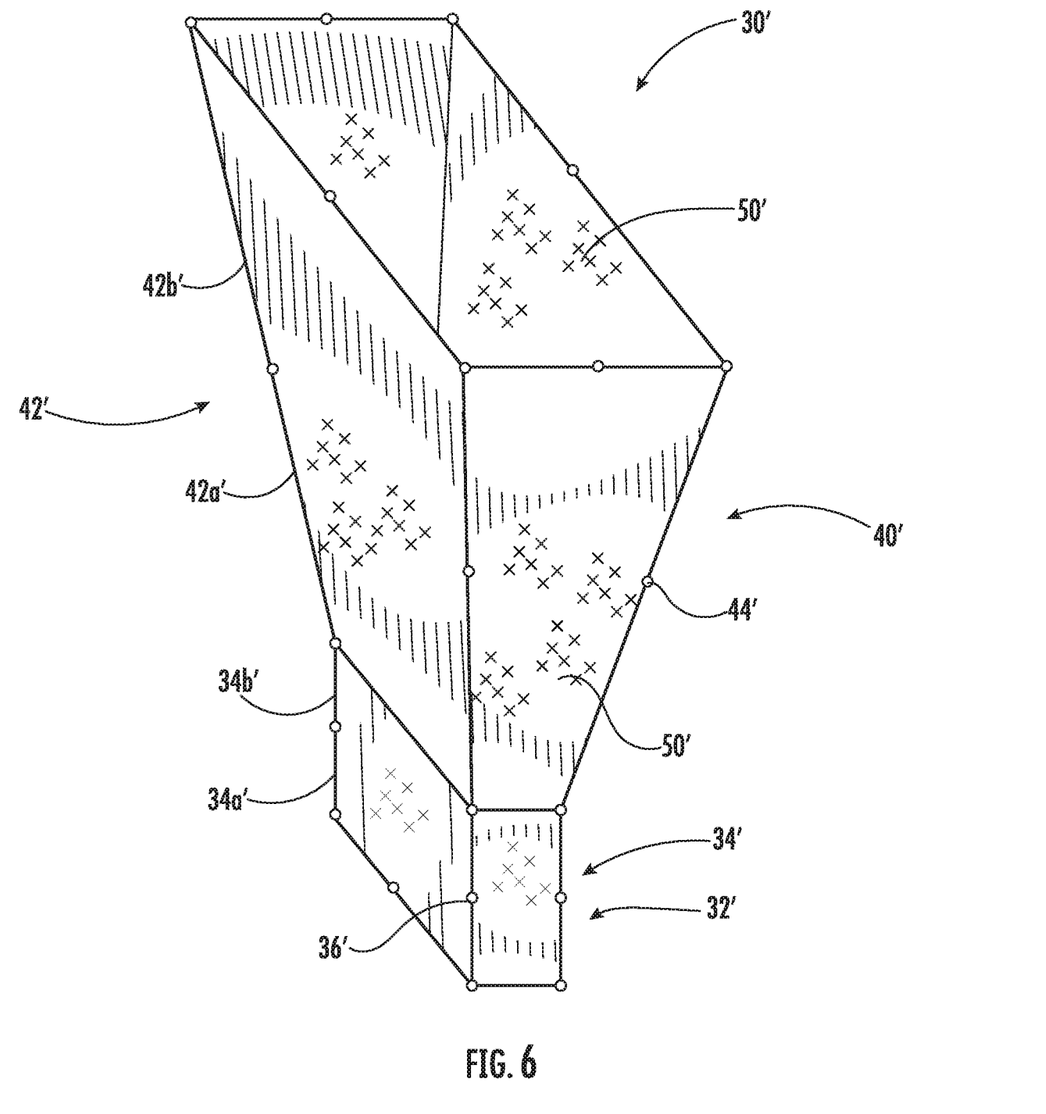
FIG. 6 is a perspective view of a different embodiment of the antenna showing a rectangular waveguide antenna feed section.

A horn antenna section 40 is coupled to the waveguide antenna feed section 32 and includes a second plurality of wires 42 and a second plurality of biased hinges 44 coupling the second plurality of wires together to be self-biased to move between the collapsed stored configuration and the extended deployed configuration. A flexible electrically conductive layer 50 covers the waveguide antenna feed section 32 and the horn antenna section 40 in at least the extended deployed configuration. The plurality of wires 34,42 and biased hinges 36,44 for both the waveguide antenna feed section 32 and horn antenna section 40 provide a wire framework allowing the outer space deployable antenna 30 to be stowed flat as shown in FIG. 2, and extended into a deployed configuration through a series of progressively expanded or extended positions as shown in FIGS. 3 and 4 and fully expanded into the extended deployed configuration (FIG. 5). The extended and deployed antenna 30 operates as a horn antenna on a small satellite 20 such as the CubeSat. The waveguide antenna feed section 32 may have a square cross-section in the extended deployed configuration as shown in FIGS. 1 and 5, or a rectangular cross-section as shown in the embodiment of the antenna 30' FIG. 6, where prime notation is used for corresponding similar components as in the embodiment of FIGS. 1 and 5. The horn antenna section 40 has an inverted pyramidal cross-section in its extended deployed configuration.

This first plurality of wires 34 include a first of pairs of wires with each first pair of wires including lower and upper wires shown respectively at 34a and 34b, with the corresponding biased hinge 36 therebetween. The second plurality of wires 42 also include a second pairs of wires with each second pair of wires including lower and upper wires shown respectively at 42a and 42b with the corresponding hinge 44 therebetween.

To allow the flexible electrically conductive layer 50 to expand with the waveguide antenna feed section 32 and horn antenna section 40, the layer is substantially free-floating and moves without binding to the plurality of wires 34,42.

The flexible electrically conductive layer 50 may be coupled to the waveguide antenna feed section 32 and the horn antenna section 40 at selected attachment points, such that as the first and second plurality of wires 34,42 are deployed upward, the flexible electrically conductive layer 50 may slide relative to the wires 34,42 as they are deployed upward. The flexible electrically conductive layer 50 is connected to the wires 34,42 such that when expanded into the fully deployed position, the conductive layer is drawn tight.

Figure 5A:
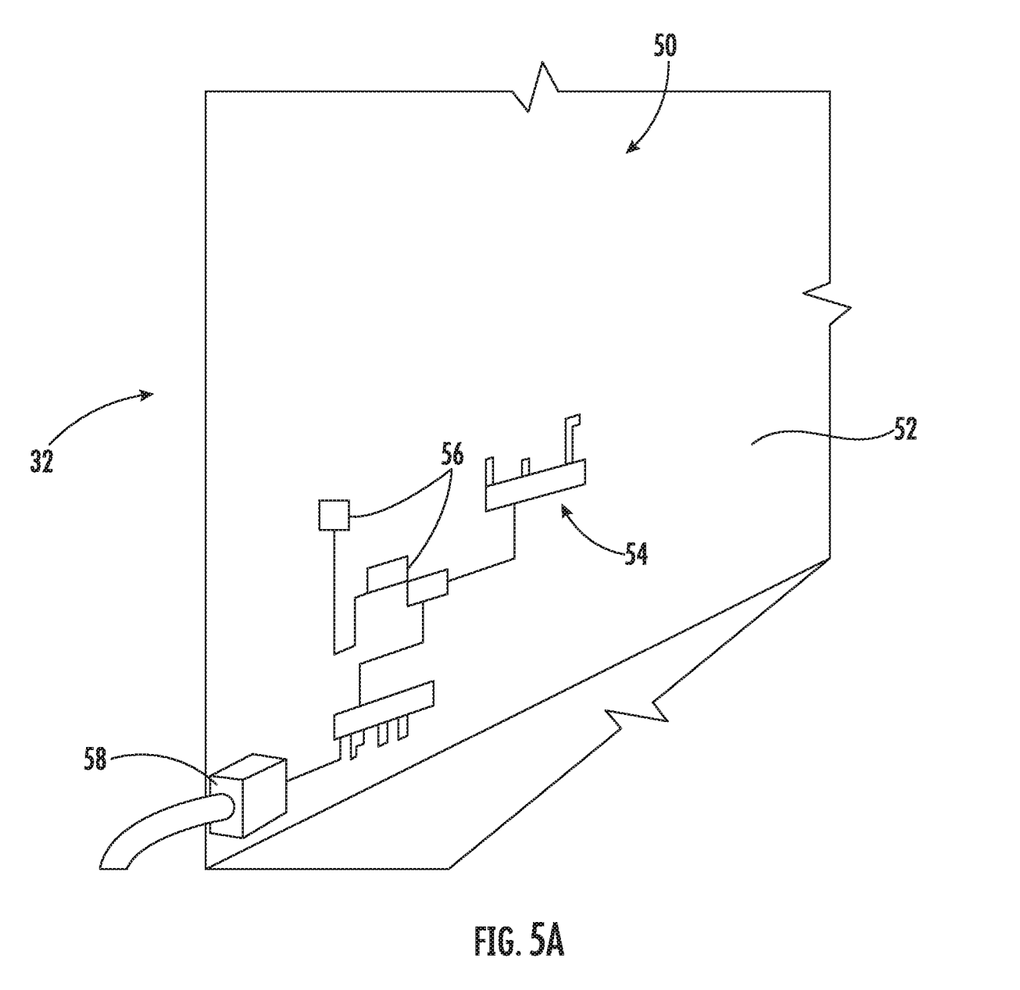
FIG. 5A is a fragmentary view of a section of the electrically conductive layer.

In one embodiment, the flexible electrically conductive layer 50 is shown in the enlarged sidewall section in FIG. 5A, and includes a flexible dielectric layer 52 and a metallization layer 54. The flexible electrically conductive layer 50 may be formed from metallized Mylar as a flexible thin material that could range from a low 1 or 2 mil thickness to substantially greater thicknesses, such as up to 10 to 20 mil thickness for added rigidity. Mylar has been found advantageous as a metallized BoPET (Biaxially-Oriented Polyethylene Terephthalate) since it has good tensile strength, chemical and dimensional stability, good barrier resistance and insulator properties, and excellent reflectivity. The metallization layer in an example could be about ½ mil thick in an example and be formed as a copper coating. It is also possible to use Kapton as a polyimide film that includes a metallized layer thereon.

The advantage of using metallized Mylar or Kapton with the copper coating as a preferred metallic coating is it is possible to etch circuitry 56 or patterns (FIG. 5A) onto the side of the antenna 30, such as Low Noise Amplifiers (LNA) or other active or passive electronic devices. In this example, the etched circuitry 56 or patterns is connected to a signal junction and feed element 58 as part of the waveguide antenna feed section 32. Any etched circuitry 56 could be powered by a 5 or 12 volt DC voltage as typical in satellites with power provided by solar powered cells. An active RF feed could be provided with etched components. Any heat generated by active components formed or positioned on the antenna 30 may be minimized since the satellite housing 22 may provide some cooling, together with the antenna 30 itself as a thermal radiator in outer space. The first plurality of wires 34 and second plurality of wires 42 may be formed from rigid small gauged wire ranging from a thick 10 gauge to 20 gauge. Other sizes could be used depending on the design parameters. In an example, etched metallization circuitry 56 or patterns may be included on one or more conductive layers, including circuitry or patterns which may interact with or direct electromagnetic fields or energy either independently or together with embedded attached electronic circuitry. The etched circuitry 56 or patterns may form electronic components that are attached to the deployed, flexible electrically conductive layer 50.

Different materials could be used to form the wires 34,42, including reinforced carbon fiber, reinforced nylon filaments, carbon fiber reinforced aluminum-magnesium alloy composite, a lightweight metallic material, such as aluminum or lightweight high tensile steel wire, or other components that impart rigidity to the wires. The biased hinges 36,44 coupling the wires 34,42 together may use coupling pins connected to flattened portions of the wire having holes receiving the pins and springs connected to the pins and wires, or the wires could be connected directly to springs that help form the biased hinges. Examples of different springs that could connect directly to wires 34,42 and act as pivots or connect to coupling pins and include a hairpin spring, s 90° deflector spring, a Gardener spring, a torsion spring, a constant force spring, or a coil spring. A scissor strut assembly formed of wires with biased springs may be used.

In an example, a solar panel 26 carried by the satellite housing 23 could retain the outer space deployable antenna 30 when it is stowed in its collapsed stored configuration. For example, a small storage area could be formed in the side of the satellite 20 forming a slight indentation in the housing 22. The antenna 30 may be retained in the collapsed stored configuration and covered and retained by the solar panels 26 that keep it from extending outward. When the satellite 20 reaches its desired orbit, the solar panels 26 move outward away from the satellite via a normal pivot mechanism commonly used in small satellites, and the biased hinges 36,44 coupling the first and second plurality of wires 34,42 together will be free to deploy outward since the solar panel covering the collapsed and stored antenna 30 has been removed, allowing the antenna 30 to extend into its deployed configuration. Other mechanisms besides the solar panels 26 to retain the antenna 30 in a collapsed configuration may include a lock mechanism connected to each spring forming biased hinges 36,44. When the satellite 30 reaches a desired orbit, a pivoting latch could be released, allowing any springs to bias the wires 34,42, permitting the waveguide antenna feed section 32 and horn antenna section 40 to extend into the deployed configuration. It is possible to use other mechanisms, including extending rods or a radial deployment mechanism, where the antenna 30 is stowed flat on its side and springs can bias the antenna radially upward from the side.

The outer space deployable antenna 30 as described provides various advantages for use with small satellites such as CubeSats. The antenna 30 is formed as a lightweight antenna that has low volume and high power handling capability. It can be single or dual polarization and may have a simple mechanism for deployment. Various shapes could be selected for the antenna 30 besides the illustrated square (FIG. 5) or rectangular (FIG. 6) waveguide antenna feed section 32,32' and the inverted pyramidal cross-section for the horn antenna section 40. Cylindrical or other known horn antenna shapes sometimes employed as satellite antennas could be used. The smooth side walls formed by the flexibly electrically conductive layer 50 when the antenna is in its extended deployed configuration provides a smooth side wall for low signal loss. Use of the flexible dielectric layer 50 having the metallization layer 54 such as metallized Mylar permits etched circuit patterns to be formed on the side walls. This outer space deployable antenna 30 has a high compaction ratio. It is possible to use the antenna 30 with other reflector antennas for a wide range of applications from 0.1 to 18 GHz, and it can also be used by itself without a reflector.

The antenna may be used with remote sensing similar to a Hawkeye 360 system for RF sensing and used in different communications with different scenarios, including voice communication, machine-to-machine communication, and special communications. The antenna 30 may be adapted for a high power transmit broadcast application with PNT, paging, beacons, and similar applications.

Figure 7:
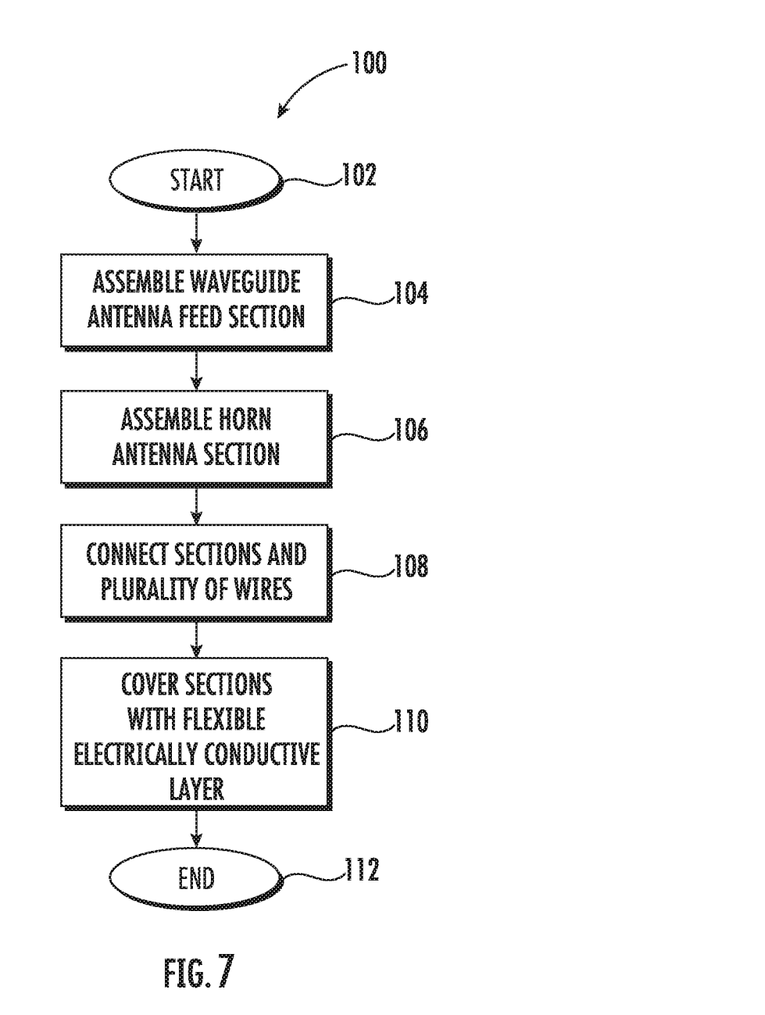
FIG. 7 is a high-level flowchart of a method for making the antenna.

Different manufacturing techniques may be used and an example is shown in the high-level flowchart of FIG. 7. A method for making the outer space deployable antenna 30 is illustrated generally at 100. The process starts (Block 102) and the waveguide antenna feed section is assembled (Block 104) by connecting the first plurality of wires together to be self-biased such as by a spring mechanism that is incorporated into the connection. The horn antenna section is assembled (Block 106) by connecting the second plurality of wires together, including any springs and hinge mechanism. The waveguide antenna feed section is connected to the horn antenna section by connecting the first plurality of wires to the second plurality of wires to form a hinged connection (Block 108). The waveguide antenna feed section and the horn antenna section are covered with the flexible electrically conductive layer at selected points (Block 110). The process ends (Block 112).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An outer space deployable antenna comprising:
a waveguide antenna feed section comprising a first plurality of wires and a first plurality of biased hinges coupling the first plurality of wires together to be self-biased to move between a collapsed stored configuration and an extended deployed configuration;
a horn antenna section coupled to the waveguide antenna feed section and comprising a second plurality of wires and a second plurality of biased hinges coupling the second plurality of wires together to be self-biased to move between the collapsed stored configuration and the extended deployed configuration; and
a flexible electrically conductive layer covering the waveguide antenna feed section and the horn antenna section in at least the extended deployed configuration.

2. The outer space deployable antenna of claim 1 wherein the waveguide antenna feed section has a rectangular cross section in the extended deployed configuration.

3. The outer space deployable antenna of claim 1 wherein the waveguide antenna feed section has a square cross section in the extended deployed configuration.

4. The outer space deployable antenna of claim 1 wherein the horn antenna section has an inverted pyramidal cross section in the extended deployed configuration.

5. The outer space deployable antenna of claim 1 wherein the first plurality of wires comprises first pairs of wires, each first pair of wires comprising lower and upper wires with a corresponding hinge therebetween.

6. The outer space deployable antenna of claim 1 wherein the second plurality of wires comprises second pairs of wires, each second pair of wires comprising lower and upper wires with a corresponding hinge therebetween.

7. The outer space deployable antenna of claim 1 wherein the flexible electrically conductive layer is coupled to the waveguide antenna feed section and the horn antenna section only at selected attachment points.

8. The outer space deployable antenna of claim 1 wherein the flexible electrically conductive layer comprises a flexible dielectric layer and a metallization layer thereon.

9. The outer space deployable antenna of claim 8 wherein the flexible electrically conductive layer comprises etched patterns to interact and direct electromagnetic energy.

10. The outer space deployable antenna of claim 8 wherein the flexible electrically conductive layer includes electronic components.

11. A satellite comprising:
a satellite housing;
a satellite transceiver carried by the satellite housing; and
an outer space deployable antenna carried by the satellite housing and coupled to the satellite transceiver, the outer space deployable antenna comprising
a waveguide antenna feed section comprising a first plurality of wires and a first plurality of biased hinges coupling the first plurality of wires together to be self-biased to move between a collapsed stored configuration and an extended deployed configuration,
a horn antenna section coupled to the waveguide antenna feed section and comprising a second plurality of wires and a second plurality of biased hinges coupling the second plurality of wires together to be self-biased to move between the collapsed stored configuration and the extended deployed configuration, and
a flexible electrically conductive layer covering the waveguide antenna feed section and the horn antenna section in at least the extended deployed configuration.

12. The satellite of claim 11 wherein the waveguide antenna feed section has a rectangular cross section in the extended deployed configuration.

13. The satellite of claim 11 wherein the waveguide antenna feed section has a square cross section in the extended deployed configuration.

14. The satellite of claim 11 wherein the horn antenna section has an inverted pyramidal cross section in the extended deployed configuration.

15. The satellite of claim 11 wherein the first plurality of wires comprises first pairs of wires, each first pair of wires comprising lower and upper wires with a corresponding hinge therebetween.

16. The satellite of claim 11 wherein the second plurality of wires comprises second pairs of wires, each second pair of wires comprising lower and upper wires with a corresponding hinge therebetween.

17. The satellite of claim 11 wherein the flexible electrically conductive layer is coupled to the waveguide antenna feed section and the horn antenna section only at selected attachment points.

18. The satellite of claim 11 wherein the flexible electrically conductive layer comprises a flexible dielectric layer and a metallization layer thereon.

\* \* \* \* \*